US012791085B2

(12) United States Patent
Guo et al.

(10) Patent No.: US 12,791,085 B2
(45) Date of Patent: Nov. 10, 2026

(54) ANTI-ELECTROPHORETIC LIQUID INFILTRATION ANGLE ADJUSTER AND ASSEMBLY METHOD THEREFOR

(71) Applicants: KEIPER (CHANGSHU) SEATING MECHANISMS CO., LTD., Suzhou (CN); KEIPER SEATING MECHANISMS CO., LTD., Shanghai (CN)

(72) Inventors: Jinbao Guo, Suzhou (CN); Hongbing Liang, Suzhou (CN); Cong Li, Suzhou (CN); Jianyong Hu, Suzhou (CN); Yunhua Tang, Suzhou (CN)

(73) Assignees: KEIPER (CHANGSHU) SEATING MECHANISMS CO., LTD., Suzhou (CN); KEIPER SEATING MECHANISMS CO., LTD., Shanghai (CN)

( * ) Notice: Subject to any disclaimer, the term of this patent is extended or adjusted under 35 U.S.C. 154(b) by 0 days.

(21) Appl. No.: 18/867,353

(22) PCT Filed: Apr. 24, 2023

(86) PCT No.: PCT/CN2023/090197
§ 371 (c)(1),
(2) Date: Nov. 19, 2024

(87) PCT Pub. No.: WO2023/221745
PCT Pub. Date: Nov. 23, 2023

(65) Prior Publication Data

US 2025/0198487 A1 Jun. 19, 2025

(30) Foreign Application Priority Data

May 20, 2022 (CN) ........................ 202210550840.X

(51) Int. Cl.
*F16H 19/08* (2006.01)
*B60N 2/90* (2018.01)
*C25D 13/12* (2006.01)

(52) U.S. Cl.
CPC ............ *F16H 19/08* (2013.01); *C25D 13/12* (2013.01); *B60N 2/938* (2018.02)

(58) Field of Classification Search
CPC .......... F16H 19/08; C25D 13/12; B60N 2/938
(Continued)

(56) References Cited

FOREIGN PATENT DOCUMENTS

CN 102481868 A 5/2012
CN 103129418 A 6/2013
(Continued)

OTHER PUBLICATIONS

Written Opinion for PCT/CN2023/090197 (Year: 2023).*

*Primary Examiner* — T. Scott Fix
(74) *Attorney, Agent, or Firm* — Jacob M. Ward; Ward Law Office LLC

(57) ABSTRACT

An anti-electrophoretic liquid infiltration angle adjuster comprising a gear toothed plate and a gear ring toothed plate which can rotate relative to each other. A clamping ring for holding the gear toothed plate and the gear ring toothed plate together, one end of the clamping ring fixedly connected to the gear ring toothed plate, and the other end bent towards the gear toothed plate to form a clearance fit. In an assembly method, a gap is controlled by bending and shaping the clamping ring, and impurities are prevented from entering the interior of the angle adjuster. The impurities may be further prevented from entering the angle adjuster by controlling a gap between a drive cam and the gear toothed plate. Gaps at two ends of a cover cap are controlled by selecting a metal cover cap, and the impurities may be further prevented from entering the angle adjuster.

13 Claims, 5 Drawing Sheets

(58) Field of Classification Search
USPC .......................................................... 74/89.16
See application file for complete search history.

(56) References Cited

FOREIGN PATENT DOCUMENTS

| | | | |
|---|---|---|---|
| CN | 107364370 | A | 11/2017 |
| CN | 207173359 | U | 4/2018 |
| CN | 207173361 | U | 4/2018 |
| CN | 110936861 | A | 3/2020 |
| CN | 111959356 | A | 11/2020 |
| CN | 212928772 | U | 4/2021 |
| CN | 115110135 | A | 9/2022 |
| FR | 3041293 | A1 | 3/2017 |

* cited by examiner

ANTI-ELECTROPHORETIC LIQUID INFILTRATION ANGLE ADJUSTER AND ASSEMBLY METHOD THEREFOR

BACKGROUND OF THE INVENTION

1. Field of the Invention

The present invention relates to automotive seats, more specifically to an anti-electrophoretic liquid infiltration angle adjuster and an assembly method therefor.

2. Related Art

In the development process of angle adjuster, in order to enhance the corrosion and rust resistance of the angle adjuster, a conventional electrophoretic process is typically used to electrophorese the assembled angle adjuster by immersing it in a liquid. However, due to the gaps between various components of the angle adjuster, electrophoretic liquid may enter the interior of the angle adjuster via these gaps, such as commonly via the gap between the clamping ring and the gear toothed plate, leading to increased operational torque and affecting the normal function of the angle adjuster.

SUMMARY OF THE INVENTION

In order to solve the problem of electrophoretic liquid entering the interior of the angle adjuster via gaps, which may affect the function of the angle adjuster as described in the prior art, the present invention provides an anti-electrophoretic liquid infiltration angle adjuster and an assembly method therefor.

According to the present invention, the anti-electrophoretic liquid infiltration angle adjuster comprises a gear toothed plate and a gear ring toothed plate which can rotate relative to each other; and a clamping ring for holding the gear toothed plate and the gear ring toothed plate together; wherein one end of the clamping ring is fixedly connected to the gear ring toothed plate, and the other end of the clamping ring is bent towards the gear toothed plate so as to form a clearance fit with the gear toothed plate.

Preferably, a short edge of the clamping ring is fixedly connected to an end of the gear ring toothed plate by a laser welding seam.

Preferably, an inner end surface of the clamping ring is parallel to an outer end surface of the gear toothed plate before the clamping ring is shaped, and a gap between the clamping ring and the gear toothed plate is reduced after the clamping ring is shaped.

Preferably, the anti-electrophoretic liquid infiltration angle adjuster further comprises an eccentric member driven by a drive cam, wherein the eccentric member rotates in a circumferential direction to drive a relative rolling motion of the gear tooth plate and the gear ring tooth plate.

Preferably, the gear tooth plate is provided with an outer tooth gear, wherein the gear ring tooth plate is provided with an inner tooth ring, wherein the gear tooth plate and the gear ring tooth plate are connected with each other through the outer tooth gear and the inner tooth ring that mesh with each other, and wherein the gear tooth plate is provided with a neck ring that is concentric with the outer tooth gear.

Preferably, the drive cam is provided with a cylindrical segment axially inserted into the neck ring.

Preferably, the drive cam is provided with an oil reservoir groove on an end surface at a corner.

Preferably, a wedge and a spring work together to define the eccentric member to press the outer tooth gear of the gear tooth plate into the inner tooth ring of the gear ring tooth plate at meshing positions.

Preferably, the wedge is supported on the neck ring by its curved inner surface, and carries the gear ring tooth plate by its curved outer surface.

Preferably, the anti-electrophoretic liquid infiltration angle adjuster further comprises a friction bearing, which is arranged between the curved outer surface of the wedge and a center hole of the gear ring tooth plate.

Preferably, the drive cam is provided with a drive segment, wherein the wedge is composed of two wedge-shaped segments, wherein the drive segment is inserted into a clearance between narrow sides of the two wedge-shaped segments, and wherein two ends of the spring are respectively connected to broad sides facing each other of the two wedge-shaped segments to force the two wedge-shaped segments to separate by acting on the wedge-shaped segments in the circumferential direction through the spring.

Preferably, the anti-electrophoretic liquid infiltration angle adjuster further comprises a cover cap, which is mounted over the drive cam and fixedly connected to the gear ring tooth plate.

Preferably, the cover cap is a metal cover cap.

Preferably, the cover cap is fixedly connected to the gear ring toothed plate by a laser welding seam through an outer folding edge.

Preferably, a lower surface of the outer folding edge is welded to an upper surface of the gear ring toothed plate.

Preferably, an inner folding edge of the cover cap is in close contact with a surface of the drive cam.

According to the assembly method for the above anti-electrophoretic liquid infiltration angle adjuster, comprising: meshing the outer tooth gear of the gear toothed plate with the inner tooth ring of the gear ring toothed plate; fixing one end of the clamping ring to the gear ring toothed plate; and bending the other end of the clamping ring towards the gear toothed plate to form the clearance fit.

Preferably, an anti-electrophoretic liquid grease is laid in the gap.

According to the anti-electrophoretic liquid infiltration angle adjuster of the present invention, the gap is controlled by means of bending and shaping of the clamping ring, and impurities such as electrophoretic liquid are prevented from entering the interior of the angle adjuster, thereby preventing the normal function of the angle adjuster from being affected. In addition, according to the anti-electrophoretic liquid infiltration angle adjuster of the present invention, the impurities such as electrophoretic liquid may be further prevented from entering the interior of the angle adjuster by means of controlling the gap between the drive cam and the gear toothed plate. Moreover, according to the anti-electrophoretic liquid infiltration angle adjuster of the present invention, gaps at two ends of the cover cap is controlled by means of selecting a metal cover cap to be the cover cap, and the impurities such as electrophoretic liquid may be further prevented from entering the interior of the angle adjuster.

DESCRIPTION OF THE ENABLING EMBODIMENT

The preferred embodiments of the present invention are described in detail below in conjunction with the accompanying drawings.

Figure 1:
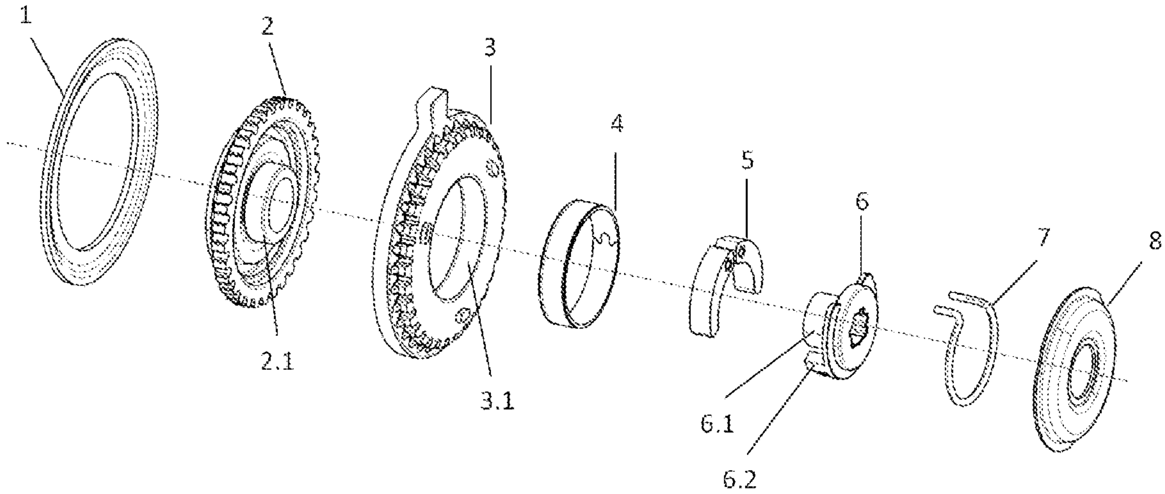
FIG. 1 is an exploded view of the anti-electrophoretic liquid infiltration angle adjuster according to a preferred embodiment of the present invention.
Figure 2:
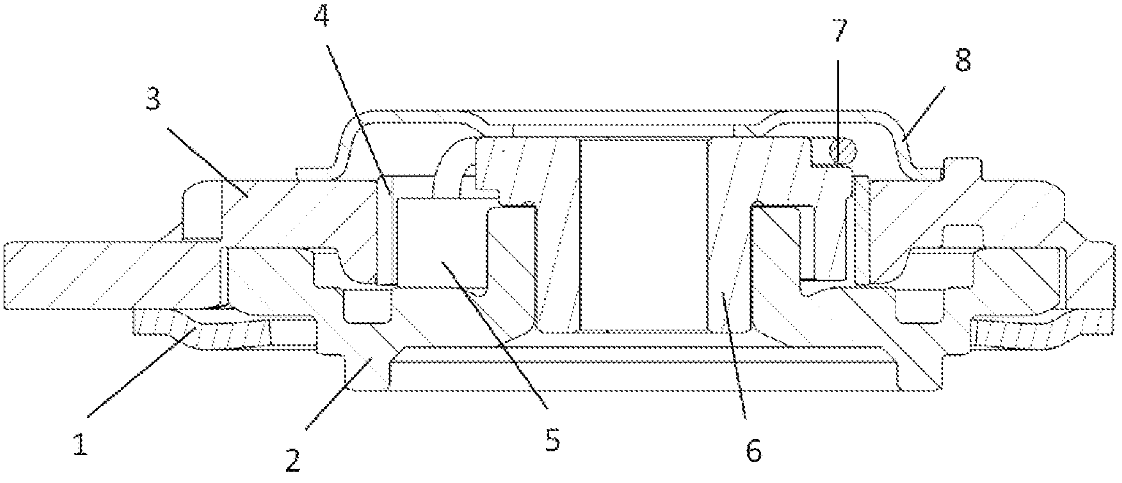
FIG. 2 is a cross-sectional view of the anti-electrophoretic liquid infiltration angle adjuster according to a preferred embodiment of the present invention.

As shown in FIGS. 1-2, an anti-electrophoretic liquid infiltration angle adjuster according to a preferred embodiment of the present invention comprises a clamping ring 1, a gear toothed plate 2 and a gear ring toothed plate 3, wherein the gear toothed plate 2 and the gear ring toothed plate 3 are configured to rotate relative to each other, and the clamping ring 1 is used to hold the gear toothed plate 2 and the gear ring toothed plate 3 together. In the present embodiment, the clamping ring 1 for absorbing the axial force is fixedly connected to the gear ring toothed plate 3. It should be understood that the clamping ring 1 does not interfere the relative rotation of the gear toothed plate 2 and the gear ring toothed plate 3.

For the installation of the anti-electrophoretic liquid infiltration angle adjuster, the gear toothed plate 2 can be mounted on the seat, and the gear ring toothed plate 3 can be mounted on the backrest to adjust the inclination angle of the backrest relative to the seat. Of course, the mounting positions of the gear toothed plate 2 and the gear ring toothed plate 3 can be interchanged, i.e., the gear tooth plate 2 can be mounted on the backrest, and the gear ring tooth plate 3 can be mounted on the seat.

The gear toothed plate 2 and the gear ring toothed plate 3 are connected to each other via gears to adjust and fix in place. In order to form a gear connection, an outer tooth gear is formed on the gear tooth plate 2, and an inner tooth ring is formed on the gear ring tooth plate 3, with the outer tooth gear and the inner tooth ring meshing with each other. The diameter of an outer tooth tip circle of the outer tooth gear is smaller than the diameter of an inner tooth root circle of the inner tooth ring by at least one tooth height. The outer tooth gear and the inner tooth ring differ by at least one tooth in the number of teeth, which allows the inner tooth ring to perform a rolling motion on the outer tooth gear.

The gear toothed plate 2 is provided with a neck ring 2.1 that is concentric with the outer tooth gear. The anti-electrophoretic liquid infiltration angle adjuster according to the present embodiment further comprises a wedge 5, which is supported on the neck ring 2.1 by its curved inner surface and carries the gear ring toothed plate 3 by its curved outer surface. Correspondingly, the anti-electrophoretic liquid infiltration angle adjuster according to the present embodiment further comprises a friction bearing 4, which is arranged between the curved outer surface of the wedge 5 and a center hole 3.1 of the gear ring toothed plate 3. In addition, the anti-electrophoretic liquid infiltration angle adjuster according to the present embodiment further comprises a drive cam 6, wherein a cylindrical segment 6.1 that extends out axially is inserted into the neck ring 2.1 and is provided with a boring hole in the center for accepting and matching a drive shaft to drive the drive cam 6 by the drive shaft. In the present embodiment, the drive cam 6 is a metal piece. Furthermore, the drive cam 6 is provided with a drive segment 6.2. The wedge 5 is composed of two wedge-shaped segments, and the drive segment 6.2 of the drive cam 6 is inserted into a clearance between narrow sides of the two wedge-shaped segments. Moreover, the anti-electrophoretic liquid infiltration angle adjuster according to the present embodiment further comprises a spring 7, whose two ends are respectively connected to broad sides facing each other of the two wedge-shaped segments to force the two wedge-shaped segments to separate by acting on the wedge-shaped segments in the circumferential direction through the spring 7. In this way, the wedge 5 and the spring 7 work together to define an eccentric member, which is used to press the outer tooth gear of the gear tooth plate 2 into the inner tooth ring of the gear ring tooth plate 3 at meshing positions. Furthermore, the anti-electrophoretic liquid infiltration angle adjuster according to the present embodiment further comprises a cover cap 8, which is mounted over the drive cam 6 and fixedly connected to the gear ring tooth plate 3.

The specific assembly process of the anti-electrophoretic liquid infiltration angle adjuster according to the present embodiment comprises: the friction bearing 4 is pressed into the center hole 3.1 of the gear ring tooth plate 3 with an interference fit; the outer tooth gear of the gear tooth plate 2 is meshed with the inner tooth ring of the gear ring tooth plate 3; the cylindrical segment 6.1 of drive cam 6 is embedded in the neck ring 2.1 of the gear tooth plate 2; the two ends of the spring 7 are respectively inserted into the holes of broad sides of the two wedge-shaped segments of wedge 5; the wedge 5 is placed in the space formed by the friction bearing 4 and the neck ring 2.1, and is kept in close contact; the clamping ring 1 is connected to the gear ring tooth plate 3 by welding; and the cover cap 8 is welded to the gear ring tooth plate 3.

The specific working mechanism of the anti-electrophoretic liquid infiltration angle adjuster according to the present embodiment comprises: during the driving process by rotating the drive shaft, the torque is first transmitted to the drive cam 6, and then passed to the eccentric member (formed by the wedge 5 and the spring 7) through the drive segment 6.2. The eccentric member slides along the friction bearing 4, causing a displacement in its eccentric direction, and thus the meshing position of the outer tooth gear of the gear toothed plate 2 within the inner tooth ring of the gear ring toothed plate 3 is shifted. This allows for continuous and variable adjustment of the inclination of the backrest.

In particular, the clamping ring 1 of the anti-electrophoretic liquid infiltration angle adjuster of the present invention is shaped to control a gap between the clamping ring 1 and the gear toothed plate 2. The anti-electrophoretic liquid grease laid in the gap not only provides a lubricating function but also provides a characteristic of being difficult to be removed, by which impurities such as electrophoretic liquid are prevented from entering the interior of the angle adjuster through a path A, as shown in FIG. 3.

Figure 4:
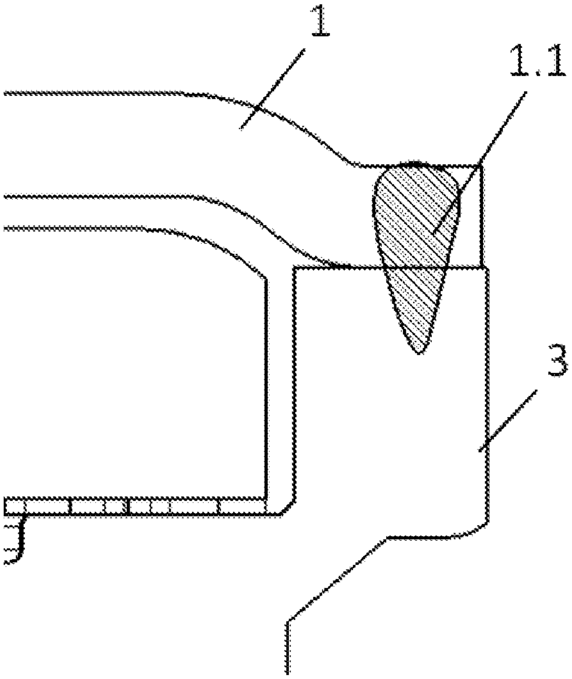
FIG. 4 shows the connection between the clamping ring and the gear ring toothed plate of the anti-electrophoretic liquid infiltration angle adjuster of FIGS. 1-2.
Figure 5:
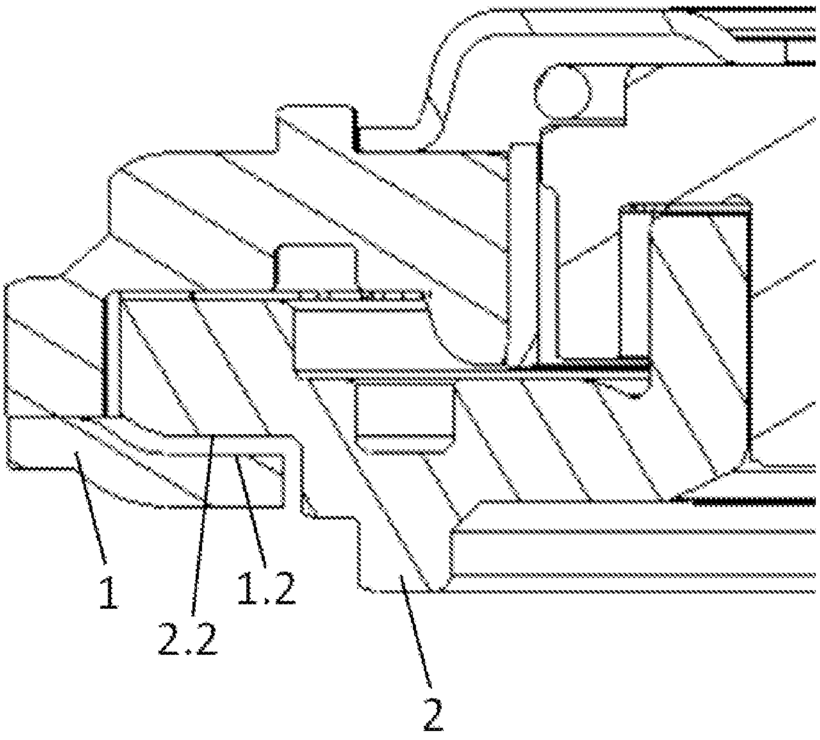
FIG. 5 shows the positions of the clamping ring before shaping and the gear toothed plate of the anti-electrophoretic liquid infiltration angle adjuster of FIGS. 1-2.
Figure 6:
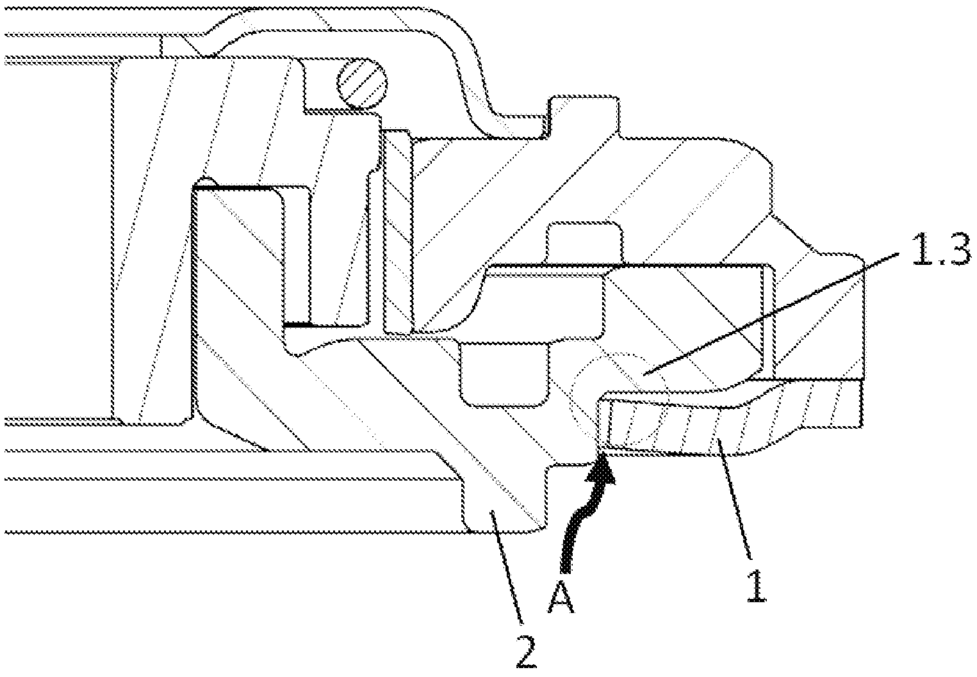
FIG. 6 shows the positions of the shaped clamping ring and the gear toothed plate of the anti-electrophoretic liquid infiltration angle adjuster of FIGS. 1-2.

As mentioned above, one end of the clamping ring 1 is fixedly connected to the gear ring toothed plate 3, and the other end of the clamping ring 1 restricts an axial movement of the gear toothed plate 2. As shown in FIG. 4, a short edge of the clamping ring 1 is fixedly connected to the end of the gear ring toothed plate 3 by a laser welding seam 1.1. As shown in FIG. 5, an inner end surface 1.2 of the clamping ring 1 is parallel to an outer end surface 2.2 of the gear toothed plate 2 before the clamping ring is shaped. The operation of shaping the clamping ring 1 comprises bending an inner end of the clamping ring 1 towards the outer end surface 2.2 of the gear toothed plate 2 to form a smaller clearance fit with the outer end surface 2.2 of the gear toothed plate 2. As shown in FIG. 6, the inner end of the clamping ring 1 forms a smaller gap fit 1.3 with the gear toothed plate 2 after the clamping ring 1 is shaped. With the cooperation of the anti-electrophoretic liquid grease, it is easier to form a sealed space to prevent the electrophoretic liquid from entering the interior of the angle adjuster through the path A, while also reducing the axial shaking of the gear toothed plate.

Figure 3:
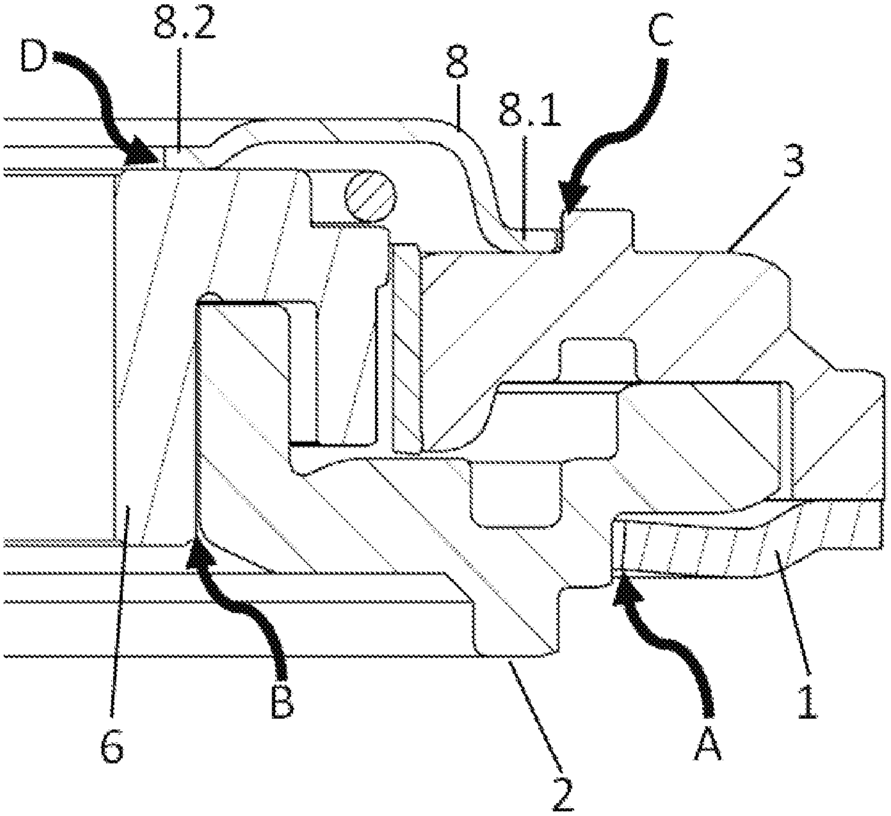
FIG. 3 shows four paths for electrophoretic liquid infiltration of the anti-electrophoretic liquid infiltration angle adjuster of FIGS. 1-2.

In particular, the impurities such as electrophoretic liquid can be prevented from entering the interior of the angle adjuster through a path B by means of controlling a gap between the drive cam 6 and the gear toothed plate 2 of the anti-electrophoretic liquid infiltration angle adjuster of the present invention, as shown in FIG. 3.

Figure 7:
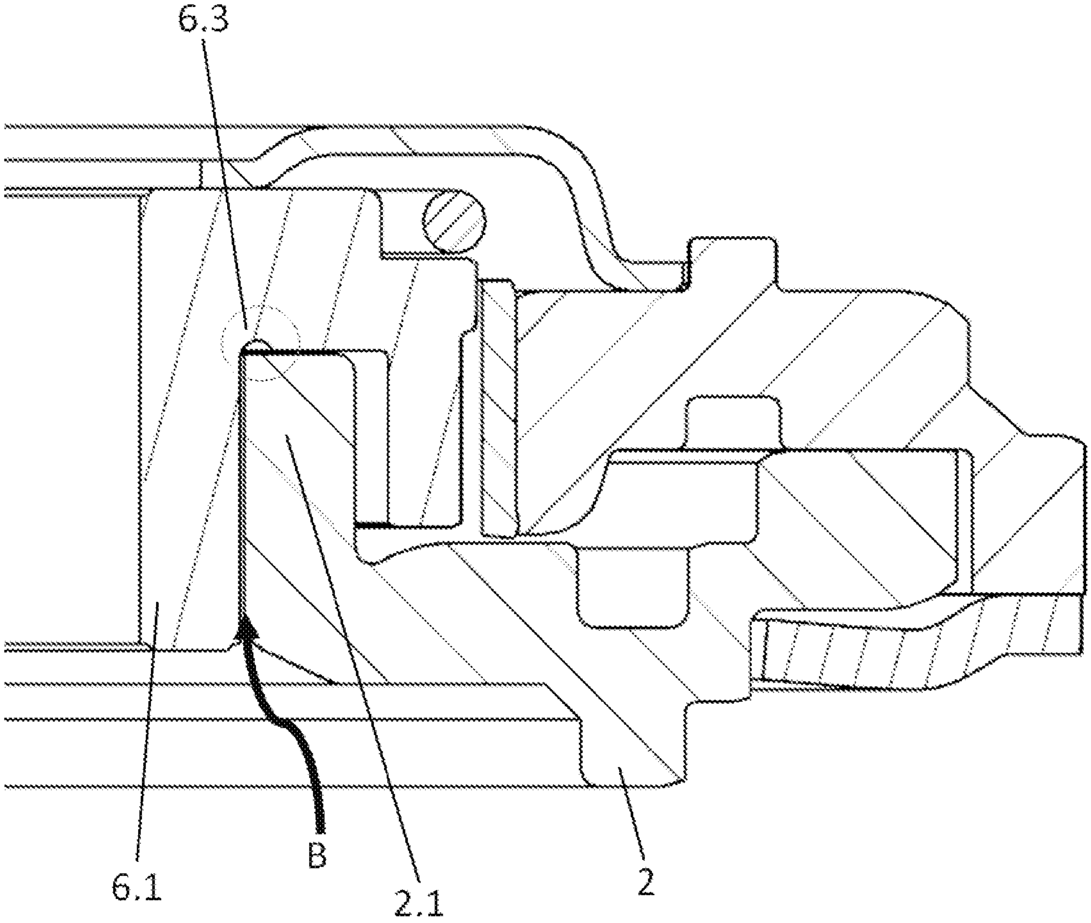
FIG. 7 shows the positions of the gear toothed plate and the drive cam of the anti-electrophoretic liquid infiltration angle adjuster of FIGS. 1-2.

As shown in FIG. 7, the cylindrical segment 6.1 of the drive cam 6 is inserted into the neck ring 2.1 of the gear toothed plate 2, and they are connected by a cylindrical surface clearance fit. The anti-electrophoretic liquid grease laid in the gap not only provides a lubricating function but also provides a characteristic of being difficult to be removed. The electrophoretic liquid can be prevented from entering the interior of the angle adjuster through the path B while ensuring the normal function of the angle adjuster, playing a sealing role. In order to further improve the sealing, the drive cam 6 is provided with an oil reservoir groove 6.3 on the end surface at the corner, into which the anti-electrophoretic liquid grease is filled. On the one hand, it can play the lubricating role on the contact surfaces of the drive cam 6 and the gear toothed plate 2. On the other hand, it can play a double sealing role to prevent the electrophoretic liquid from entering the interior of the angle adjuster through the path B.

In particular, the impurities such as electrophoretic liquid can be prevented from entering the interior of the angle adjuster through paths C and D by means of controlling gaps at both ends of the cover cap 8 of the anti-electrophoretic liquid infiltration angle adjuster of the present invention, as shown in FIG. 3.

Figure 8:
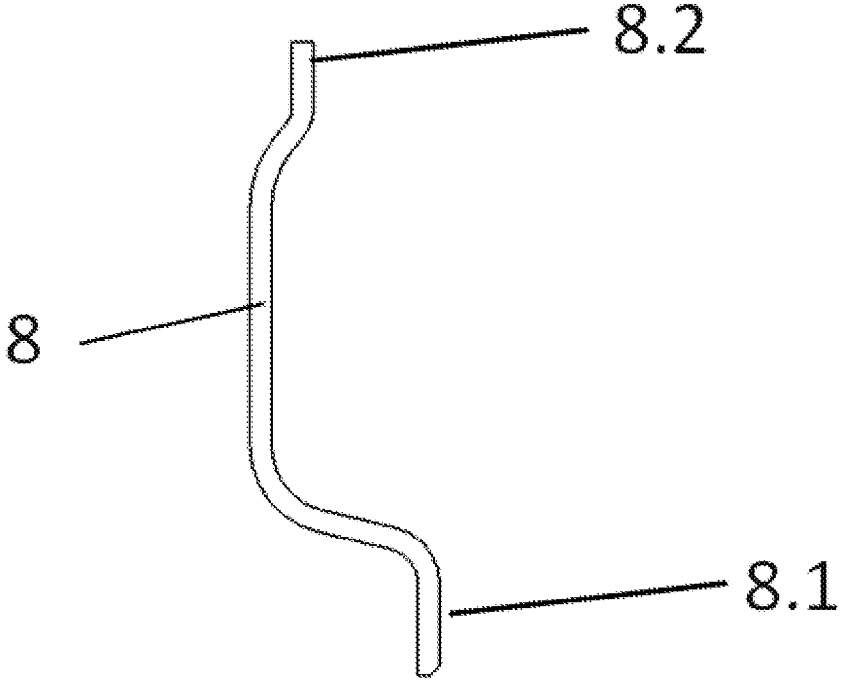
FIG. 8 is a cross-sectional view of the cover cap of the anti-electrophoretic liquid infiltration angle adjuster of FIGS. 1-2.
Figure 9:
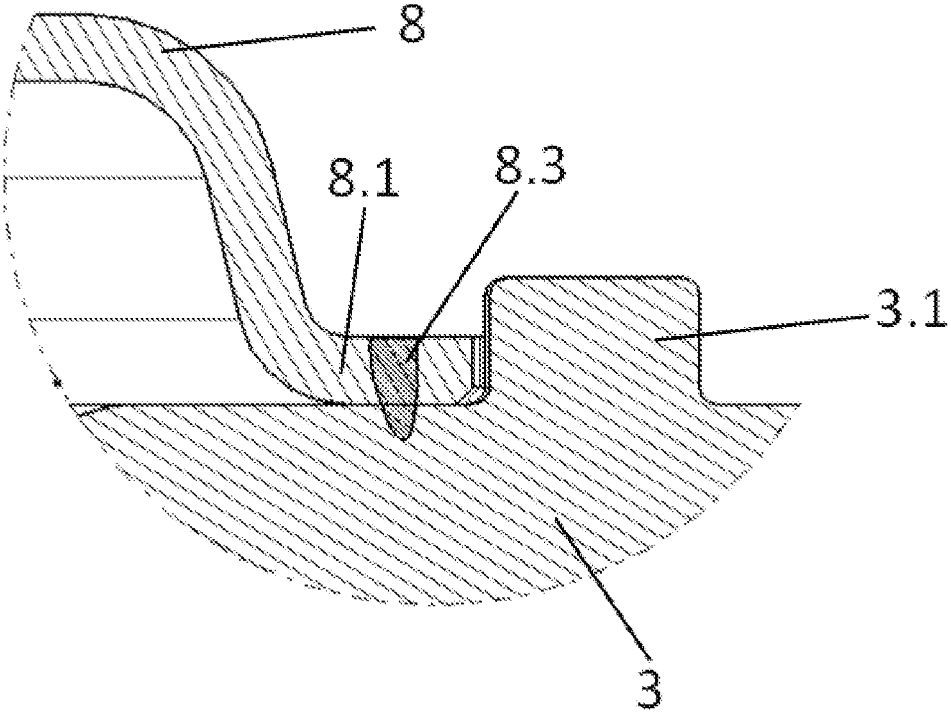
FIG. 9 shows the connection between the cover cap and the gear ring toothed plate of the anti-electrophoretic liquid infiltration angle adjuster of FIGS. 1-2.

As shown in FIG. 8, the cross-section of the cover cap 8 is roughly L-shaped, with a radially extending outer folding edge 8.1 and a radially extending inner folding edge 8.2 at both ends. In particular, the cover cap 8 is a metal cover cap, which is fixedly connected to the gear ring toothed plate 3 by a laser welding seam 8.3 through the outer folding edge 8.1, as shown in FIG. 9, fundamentally preventing impurities such as electrophoretic liquid from entering the interior of the angle adjuster through a path C (see FIG. 3). Specifically, the outer folding edge 8.1 of the cover cap 8 is in conjunction with the inner edge of a convex platform 3.1 of the gear ring toothed plate 3. Namely, a lower surface of the outer folding edge 8.1 is in contact with and welded to an upper surface of the gear ring toothed plate 3 by laser penetration welding, thus preventing the electrophoretic liquid from entering the interior of the core through the path C (see FIG. 3). The cover cap 8 is a metal cover cap, which can avoid deformation, warping, etc., caused by environmental changes. The gap between the cover cap 8 and the drive cam 6 can be more easily controlled to prevent the impurities such as electrophoretic liquid from entering the interior of the core through a path D (see FIG. 3). Specifically, the inner folding edge 8.2 of the cover cap 8 is in close contact with the surface of the drive cam 6. The anti-electrophoretic liquid grease laid in the gap not only provides a lubricating function but also provides a characteristic of being difficult to be removed, by which the electrophoretic liquid is prevented from entering the interior of the angle adjuster through the path D.

The foregoing description refers to preferred embodiments of the present invention and is not intended to limit the scope of the present invention. Various changes can be made to the foregoing embodiments of the present invention. All simple and equivalent changes and modifications in accordance with the claims of the present invention and the content of the description fall into the protection scope of the patent of the present invention. What is not described in detail in the present invention is conventional technical content.

What is claimed is:

1. An anti-electrophoretic liquid infiltration angle adjuster, comprising:
- a gear toothed plate and a gear ring toothed plate which can rotate relative to each other; and
- a clamping ring for holding the gear toothed plate and the gear ring toothed plate together;
- wherein one end of the clamping ring is fixedly connected to the gear ring toothed plate, and the other end of the clamping ring is bent towards the gear toothed plate so as to form a clearance fit with the gear toothed plate;
- wherein a short edge of the clamping ring is fixedly connected to an end of the gear ring toothed plate by a laser welding seam;
- wherein an inner end surface of the clamping ring is parallel to an outer end surface of the gear toothed plate before the clamping ring is shaped, and a gap between the clamping ring and the gear toothed plate is reduced after the clamping ring is shaped;
- an anti-electrophoretic liquid grease is laid in the reduced gap;
- wherein the anti-electrophoretic liquid infiltration angle adjuster further comprises an eccentric member driven by a drive cam, wherein the gear tooth plate is provided with a neck ring, wherein the drive cam is provided with a cylindrical segment axially inserted into the neck ring, wherein the drive cam is provided with an oil reservoir groove on an end surface at a corner, the anti-electrophoretic liquid grease is filled in the oil reservoir groove.

2. The anti-electrophoretic liquid infiltration angle adjuster according to the claim 1, wherein the eccentric member rotates in a circumferential direction to drive a relative rolling motion of the gear tooth plate and the gear ring tooth plate.

3. The anti-electrophoretic liquid infiltration angle adjuster according to the claim 2, wherein the gear tooth plate is provided with an outer tooth gear, wherein the gear ring tooth plate is provided with an inner tooth ring, wherein the gear tooth plate and the gear ring tooth plate are connected with each other through the outer tooth gear and the inner tooth ring that mesh with each other, and wherein the neck ring is concentric with the outer tooth gear.

4. The anti-electrophoretic liquid infiltration angle adjuster according to the claim 3, wherein a wedge and a spring work together to define the eccentric member to press the outer tooth gear of the gear tooth plate into the inner tooth ring of the gear ring tooth plate at meshing positions.

5. The anti-electrophoretic liquid infiltration angle adjuster according to the claim 4, wherein the wedge is supported on the neck ring by its curved inner surface, and carries the gear ring tooth plate by its curved outer surface.

6. The anti-electrophoretic liquid infiltration angle adjuster according to the claim 5, wherein the anti-electrophoretic liquid infiltration angle adjuster further comprises a friction bearing, which is arranged between the curved outer surface of the wedge and a center hole of the gear ring tooth plate.

7. The anti-electrophoretic liquid infiltration angle adjuster according to the claim 4, wherein the drive cam is provided with a drive segment, wherein the wedge is composed of two wedge-shaped segments, wherein the drive segment is inserted into a clearance between narrow sides of the two wedge-shaped segments, and wherein two ends of the spring are respectively connected to broad sides facing each other of the two wedge-shaped segments to force the two wedge-shaped segments to separate by acting on the wedge-shaped segments in the circumferential direction through the spring.

8. The anti-electrophoretic liquid infiltration angle adjuster according to the claim 2, wherein the anti-electrophoretic liquid infiltration angle adjuster further comprises a cover cap, which is mounted over the drive cam and fixedly connected to the gear ring tooth plate.

9. The anti-electrophoretic liquid infiltration angle adjuster according to the claim 8, wherein the cover cap is a metal cover cap.

10. The anti-electrophoretic liquid infiltration angle adjuster according to the claim 8, wherein the cover cap is fixedly connected to the gear ring toothed plate by a laser welding seam through an outer folding edge.

11. The anti-electrophoretic liquid infiltration angle adjuster according to the claim 10, wherein a lower surface of the outer folding edge is welded to an upper surface of the gear ring toothed plate.

12. The anti-electrophoretic liquid infiltration angle adjuster according to the claim 8, wherein an inner folding edge of the cover cap is in close contact with a surface of the drive cam.

13. An assembly method for the anti-electrophoretic liquid infiltration angle adjuster according to claim 1, comprising:

meshing the outer tooth gear of the gear toothed plate with the inner tooth ring of the gear ring toothed plate;

fixing one end of the clamping ring to the gear ring toothed plate; and bending the other end of the clamping ring towards the gear toothed plate to form the clearance fit.

* * * * *